United States Patent
Dell'Uomo et al.

(10) Patent No.: US 9,692,835 B2
(45) Date of Patent: Jun. 27, 2017

(54) METHOD AND APPARATUSES FOR THE PROVISION OF NETWORK SERVICES OFFERED THROUGH A SET OF SERVERS IN AN IMS NETWORK

(75) Inventors: Luca Dell'Uomo, Turin (IT); Paolo Belloni, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 1199 days.

(21) Appl. No.: 12/448,616

(22) PCT Filed: Dec. 27, 2006

(86) PCT No.: PCT/EP2006/012549
§ 371 (c)(1),
(2), (4) Date: Sep. 23, 2009

(87) PCT Pub. No.: WO2008/077435
PCT Pub. Date: Jul. 3, 2008

(65) Prior Publication Data
US 2010/0015958 A1 Jan. 21, 2010

(51) Int. Cl.
*H04L 29/08* (2006.01)
*H04W 4/00* (2009.01)
*H04L 29/06* (2006.01)

(52) U.S. Cl.
CPC .......... *H04L 67/16* (2013.01); *H04L 67/1002* (2013.01); *H04L 67/1038* (2013.01);
(Continued)

(58) Field of Classification Search
CPC ... H04L 51/04; H04L 12/581; H04L 65/1016; H04L 65/1069; H04L 65/1006; H04L 29/06; H04W 64/00
(Continued)

(56) References Cited

U.S. PATENT DOCUMENTS

| 7,111,300 | B1 | 9/2006 | Salas et al. | |
|---|---|---|---|---|
| 2007/0004405 | A1* | 1/2007 | Buckley et al. | 455/434 |
| 2008/0159262 | A1* | 7/2008 | Crable et al. | 370/352 |

FOREIGN PATENT DOCUMENTS

WO WO 2006090081 * 8/2006 ............. H04L 29/06

OTHER PUBLICATIONS

3rd Generation Partnership Project; Technical Specification Group Services and System Aspects; IP Multimedia Subsystem (IMS); Stage 2 (Release 7) (3GPP TS 23.228 version 7.5.0, Release 7), sections 4.2.4 and 5.5.1.*

(Continued)

*Primary Examiner* — Christopher M Brandt
*Assistant Examiner* — Jing Gao
(74) *Attorney, Agent, or Firm* — Finnegan, Henderson, Farabow, Garrett & Dunner, L.L.P.

(57) ABSTRACT

A method for managing the provision of services in a telecommunication network, wherein the services are offered through a set of servers and the telecommunication network includes at least one first network entity and a plurality of second network entities, each second network entity being adapted to access a sub-set of the servers. The method includes: 1) receiving at the first network entity a request for a predetermined service from user equipment; and 2) at the predetermined first network entity, identifying, based on the service requested by the user equipment, the second network entity which, among the plurality of second network entities, has access to the server that, among the set of servers, allows meeting the request for the predetermined service.

24 Claims, 7 Drawing Sheets

(52) U.S. Cl.
CPC ...... *H04L 65/1016* (2013.01); *H04L 65/1063* (2013.01); *H04W 4/00* (2013.01)

(58) Field of Classification Search
USPC .............................. 455/414.1, 434; 370/352
See application file for complete search history.

(56) References Cited

OTHER PUBLICATIONS

3GPP, 3$^{rd}$ Generation Partnership Project; Technical Specification Group Services and Systems Aspects; Network Architecture (Release 7), 3GPP TS 23.002 v7.1.0, pp. 1-61, (Mar. 2006).

3GPP, 3$^{rd}$ Generation Partnership Project; Technical Specification Group Services and System Aspects; IP Multimedia Subsystem (IMS); Stage 2 (Release 7), 3GPP TS 23.228 v7.5.0, pp. 1-214, (Sep. 2006).

3GPP, 3$^{rd}$ Generation Partnership Project; Technical specification Group Core Network; IP Multimedia Call Control Protocol Based on Session Initiation Protocol (SIP) and Session Description Protocol (SDP); Stage 3 (Release 6), 3GPP TS 24.229 v6.3.0, pp. 1-295, (Jun. 2004).

3GPP, Digital Cellular Telecommunications System (Phase 2+); Universal Mobile Telecommunications System (UMTS); IP Multimedia Subsystem (IMS); Stage 2 (3GPP TS 23.228 version 7.5.0 Release 7), ETSI TS 123 228 v7.5.0, pp. 1-215, XP-014035472, (Sep. 2006).

3GPP, Universal Mobile Telecommunications System (UMTS); Open Service Access (OSA) Application Programming Interface (API Mapping for Open Service Access; Part 4: Call Control Service Mapping; Sub-part 4: Multiparty Call Control ISC (3GPP TR 29.998-04-4 version 6.0.4 Release 6), ETSI TR 129 998-4-4 v6.0.4, pp. 1-103, (Dec. 2004).

* cited by examiner

METHOD AND APPARATUSES FOR THE PROVISION OF NETWORK SERVICES OFFERED THROUGH A SET OF SERVERS IN AN IMS NETWORK

CROSS REFERENCE TO RELATED APPLICATION

This application is a national phase application based on PCT/EP2006/012549, filed Dec. 27, 2006.

BACKGROUND OF THE INVENTION

Field of the Invention

The present invention relates to a method for the provision of network services in a IMS (IP multimedia subsystem) type telecommunication network.

Description of the Related Art

As disclosed by the 3$^{rd}$ Generation Partnership Project (3GPP) in TS 23.002 V7.1.0 (2006-03), an IMS comprises CN (Core Network) elements for provision of IP multimedia services comprising audio, video, text, chat, etc. and a combination of them, delivered over the PS (Packet Switched) domain.

As disclosed by the 3$^{rd}$ Generation Partnership Project (3GPP) in TS 23.228 V7.5.0 (2006-09), when a user equipment (UE) attaches and makes itself available for access to IMS services by explicitly registering in the IMS, a Serving-Call Session Control Function (S-CSCF) shall be assigned to serve the UE.

As stated in the above mentioned technical specification TS 23.228, under chapter 4.6, the CSFC is an IMS entity that may take on various roles as used in the IMS. Proxy-CSFC (P-CSFC) is the first contact point within the IM (IP multimedia) CN subsystem. Its address is discovered by UEs using a mechanism named "Local CSCF Discovery". Interrogating-CSFC (I-CSFC) is the contact point within an operator's network for all connections destined to a user of that network operator, or a roaming user currently located within that network operator's service area. Serving-CSCF (S-CSCF) performs the session control services for the UE. It maintains a session state as needed by the network operator for support of the services.

The assignment of an S-CSCF to a UE is performed according to a procedure named "IMS Registration".

Figure 1:
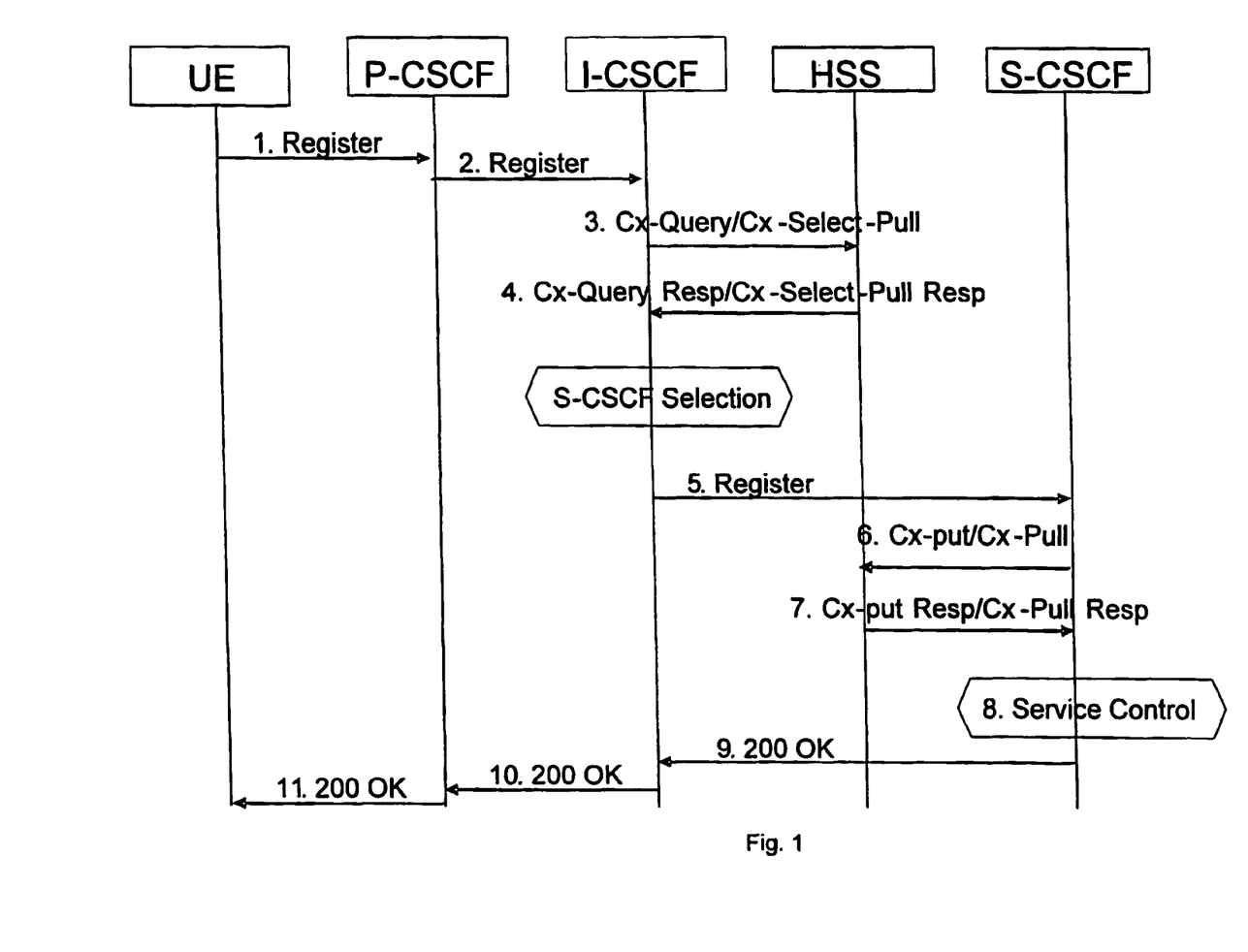
FIG. 1 schematically shows a message flow for a IMS registration procedure as disclosed in the technical specification TS 23.228.

As disclosed in the above mentioned TS 23.228, under chapter 5.2.2.3, the IMS registration can be initiated after the registration to the access is performed, and after IP connectivity for the signalling has been gained from the access network. For the purpose of the registration information flows, the user is considered to be always roaming. For user roaming in their home network, the home network shall perform the role of the visited network elements and the home network elements. In particular, as shown in FIG. 1 (corresponding to FIG. 5.1 of said Technical Specification TS 23.228):

1. After the UE has obtained IP connectivity, it can start the IM registration by sending a Register information flow to the P-CSFC (e.g., Public User Identity, Private User Identity, home network domain name, UE IP address, Globally Routable User Agent URI (GRUU) Support Indication).

2. Upon receipt of the register information flow, the P-CSCF shall examine the "home domain name" according to the above mentioned "Local CSCF Discovery" mechanism to discover the entry point to the home network (i.e. the I-CSCF). The proxy shall send the Register information flow to the I-CSCF (P-CSCF address/name, Public User Identity, Private User Identity, P-CSCF network identifier, UE IP address). A name-address resolution mechanism is utilised in order to determine the address of the home network from the home domain name. The P-CSCF network identifier is a string that identifies at the home network, the network where the P-CSCF is located (e.g., the P-CSCF network identifier may be the domain name of the P-CSCF network).

3. The I-CSCF shall send a "Cx-Query/Cx-Select-Pull" information flow to the Home Subscriber Server (HSS) (Public User Identity, Private User Identity, P-CSCF network identifier).

The HSS shall check whether the user is already registered. The HSS shall indicate whether the user is allowed to register in that P-CSCF network (identified by the P-CSCF network identifier) according to the User subscription and operator limitations/restrictions, if any.

4. A "Cx-Query Resp/Cx-Select-Pull Resp" information flow is sent from the HSS to the I-CSCF. It shall contain the S-CSCF name, if it is known by the HSS, or the S-CSCF capabilities, if it is necessary to select a new S-CSCF. When capabilities are returned, the I-CSCF shall perform the selection function of a new S-CSCF based on the capabilities returned.

If the checking in HSS was not successful the Cx-Query Resp shall reject the registration attempt.

5. The I-CSCF, using the name of the S-CSCF, shall determine the address of the S-CSCF through a name-address resolution mechanism. The I-CSCF also determines the name of a suitable home network contact point, possibly based on information received from the HSS. I-CSCF shall then send the register information flow (P-CSCF address/name, Public User Identity, Private User Identity, P-CSCF network identifier, UE IP address) to the selected S-CSCF. The home network contact point will be used by the P-CSCF to forward session initiation signalling to the home network.

The S-CSCF shall store the P-CSCF address/name, as supplied by the visited network. This represents the address/name that the home network forwards the subsequent terminating session signalling to the UE. The S-CSCF shall store the P-CSCF Network ID information.

6. The S-CSCF shall send a "Cx-Put/Cx-Pull" information flow (Public User Identity, Private User Identity, S-CSCF name) to the HSS.

7. The HSS shall store the S-CSCF name for that user and return the information flow "Cx-Put Resp/Cx-Pull Resp" (user information) to the S-CSCF. The user information passed from the HSS to the S-CSCF shall include one or more names/addresses information which can be used to access the platform(s) used for service control while the user is registered at this S-CSCF. The S-CSCF shall store the information for the indicated user. In addition to the names/addresses information, security information may also be sent for use within the S-CSCF.

8. Based on the filter criteria, the S-CSCF shall send register information to the service control platform and perform whatever service control procedures are appropriate.

9. The S-CSCF shall return a 200 OK information flow (home network contact information, a GRUU) to the I-CSCF.

10. The I-CSCF shall send information flow 200 OK (home network contact information, a GRUU) to the P-CSCF. The I-CSCF shall release all registration information after sending information flow 200 OK.

11. The P-CSCF shall store the home network contact information, and shall send information flow 200 OK (a GRUU) to the UE.

Once it has successfully performed the IMS registration, a UE can access IMS services and make use of the services offered by an application server (AS) through the S-CSCF assigned thereto. A S-CSCF to AS interface is used to provide services residing in an AS.

As stated in TS 23.002, an application server (AS) offers either the basic logic for multimedia services or value added IM services and can reside either in the user's home network or in a third party location. The third party could be a network or simply a stand-alone application server. An application server can be, for example, a SIP (Session Initiation Protocol) application server, an OSA (Open Services Architecture) application server, or a CAMEL (Customised Application Mobile Enhanced Logic) IM-SSF (IM-Service Switching Function).

Therefore, according to what disclosed in the above cited technical specifications, a S-CSCF is assigned to serve a UE at the registration of the UE in the IMS. Then, when the UE makes a request for access to a specific service, the S-CSCF assigned thereto during the IMS registration serves the UE for the provision of said specific service.

SUMMARY OF THE INVENTION

The Applicant has noted that according to this technique known in the art the provision of services to a UE is performed by a S-CSFC which is assigned to the UE without taking into account the service actually required by the UE.

The Applicant has noted that this implies that a IMS Mobile Operator has to configure all the S-CSCFs of the IMS network so that they are adapted to have access to all the application servers (ASs) offering IM services for the UEs. Among other things, this requires the installation on all the S-CSCFs of complicated filter criteria (FC) that allow the S-CSCFs to access, among all the application servers, the proper AS that allows meeting the specific service request made by the UE. This is quite onerous in terms of implementation time and cost.

Moreover, since all the S-CSCFs must have the possibility to access all the ASs, the Applicant has observed that the Mobile Operator has not the possibility to specialize the operations executed in a S-CSCF in order to provide access only to a particular (set of) AS(s) which could be specific either for offering specific services or for serving particular kind of UEs. Moreover, the Mobile Operator has not the possibility to dedicate the operation of a S-CSCF to an AS owned by a third party (that is, owned by a different actor other than the Mobile Operator), as for example a Corporate Network which provides specialized services to its employee. This is disadvantageous in terms of security and privacy issue.

Accordingly, the Applicant perceived the need of improving the provision of services in a IMS type telecommunication network. In particular, the Applicant perceived the need of overcoming the above mentioned drawbacks.

The Applicant has found that this can be achieved by a mechanism according to which the provision of services to a UE is performed through a network entity which is each time assigned to the UE based on the specific service required by the UE. This allows overcoming the above mentioned drawbacks in that it allows the Mobile Operator to configure such network entities so that each of them is adapted to have access only to one application server or to a limited number of application servers. In this way the filter criteria and the configuration of the network entities are rather simplified.

Moreover, the Mobile Operator is given the possibility to specialize the operations executed in a network entity so as to enable it to have access to a particular (set of) application server(s) which could be specific either for offering specific services or for serving particular kind of UEs. Moreover, the Mobile Operator is given the possibility to dedicate the operation of a network entity to an application server owned by a third party.

Accordingly, in a first aspect, the present invention relates to a method for managing the provision of services in a telecommunication network, wherein the services are offered through a set of (application) servers and the telecommunication network comprises at least one first network entity and a plurality of second network entities, each second network entity being adapted to access a sub-set of said servers, the method comprising:

1) receiving at said first network entity a request for a predetermined service from a user equipment;
2) at said predetermined first network entity identifying, based on the service requested by the user equipment, the second network entity which, among the plurality of second network entities, has access to the server that, among the set of servers, allows meeting the request for the predetermined service.

Typically, for a set of N servers, a subset may comprise M servers with $1 \leq M < N$ (N, M being integers).

Advantageously, the identification in 2) is performed by using suitable rules associating with each type of service that can be required by a user equipment a predetermined second network entity, among the plurality of second network entities. Examples of different types of services may be voice call, video call, voice/video exchange between two user and data traffic between them, chatting, multiparty conferencing, and so on.

Advantageously, the method further comprises 3) notifying the request made by the user equipment to the second network entity identified in 2). Advantageously, the method further comprises 4) identifying at said second network entity the server that, among the sub-set it has access to, allows meeting the request for the predetermined service. Advantageously, the method further comprises 5) the access by the second network entity to the server identified in 4) so as to meet the request for the predetermined service. Advantageously, the second network entity accesses the server identified in 4) in order to acquire either the service logic required to offer the predetermined service to the user equipment or directly the requested predetermined service.

According to an embodiment, in 3) the request is notified to the second network entity from the first network entity.

According to another embodiment, in 3) the request is notified to the second network entity from the user equipment. In this case, 3) is subordinated to sending from the first network entity to the user equipment information about the second network entity identified in 2) so as to enable the user equipment to redirect the request for the predetermined service to the second network entity. According to this embodiment, the method can further comprise receiving at the second network entity identified in 2) a further request from the user equipment for a further service. In this case, the method advantageously further comprises checking at the second network entity if, among the sub-set of servers it has access to, there is one server that allows meeting the further request for the further service made by the user equipment. In the positive, the method advantageously further comprises the access by the second network entity to the server thus identified so as to meet the further request for the further service. In the negative, the method advantageously further comprises notifying said further request for the further service from the second network entity to the first network entity. At this point, step 1)-2) and, advantageously, steps 3) to 5) are carried out again for managing said further request for the further service.

In a preferred embodiment of the invention, the communication network is an IMS type communication network.

According to an embodiment, the first network entity is assigned to the user equipment according to a registration procedure similar to that disclosed in the above mentioned technical specification TS 23.228.

According to another embodiment, the first network entity can be assigned to the user equipment in a prefixed way, and information identifying the first network entity can be advantageously preconfigured on the user equipment so that the user equipment is enabled to directly contact the first network entity to send a service request thereto.

According to another embodiment, the first network entity can be assigned to the user equipment through a GGSN (Gateway GPRS Serving/Support Node) or Gateway on a geographical basis, depending on the APN (Access Point Name) and consequently on the GGSN or Gateway that grants IP connectivity to the user and/or on a load-sharing basis.

According to a preferred embodiment of the invention, messages between the user equipment, the first network entity, the second network entities and the servers are session initiation protocol (SIP) methods, according to 3GPP TS 24.229.

For example, the request for service in 1) and 3) can be sent through a SIP Invite message.

In a second aspect, the present invention relates to a telecommunication network for the provision of services to a user equipment, the services being offered through a set of (application) servers, the telecommunication network comprising:
  at least one first network entity; and
  a plurality of second network entities, each second network entity being adapted to access a sub-set of said servers;
wherein the at least one first network entity comprises modules adapted to receive a request for a predetermined service from the user equipment; and to identify, based on the service requested by the user equipment, the second network entity which, among the plurality of second network entities, has access to the server that, among the set of servers, allows meeting the service request by the user equipment.

Typically said modules are software, firmware and/or hardware modules.

Advantageously, each second network entity comprises modules adapted to receive said request for the predetermined service. Advantageously, each second network entity is also adapted to identify the server, among the sub-set it has access to, that allows meeting the request for the predetermined service. Advantageously, each second network entity is also adapted to access the identified server so as to meet the request for the predetermined service. Advantageously, each second network entity is adapted to access the identified server in order to acquire either the service logic required to offer the predetermined service to the user equipment or directly the requested predetermined service.

According to an embodiment, each second network entity is advantageously adapted to receive the service request made by the user equipment from the first network entity.

According to another embodiment, each second network entity is advantageously adapted to receive the service request from the user equipment. According to this embodiment, the first network entity is adapted to send to the user equipment information about the identified second network entity so as to enable the user equipment to redirect the request for the predetermined service to said second network entity. According to this embodiment, each second network entity is advantageously also adapted to receive a further request for a further service from the user equipment. In this case, each second network entity is advantageously also adapted to check if, among the sub-set of servers it has access to, there is one server that allows meeting the further service request. In the positive, each second network entity is advantageously also adapted to access the identified server so as to meet the further request for the further service. In the negative, each network entity is advantageously also adapted to send said further request for the further service to the first network entity.

In a preferred embodiment of the invention, the communication network is an IMS type communication network.

As stated above, according to a preferred embodiment of the invention, messages between the user equipment, the first network entity, the second network entities and the servers are session initiation protocol (SIP) methods, according to 3GPP TS 24.229.

According to this preferred embodiment, the user equipment, the first network entity, the second network entities and the servers are SIP enabled, that is, they are adapted to support use of SIP and extensions thereof themselves or through a suitable SIP interface.

According to another aspect, the present invention relates to a network entity of a telecommunication network for the provision of services to a user equipment, the network entity comprising modules adapted to receive a request for a predetermined service from the user equipment; and to identify, based on the service requested by the user equipment, a second network entity which, among a plurality of second network entities, has access to a server that, among a set of servers, allows meeting the service request by the user equipment.

As to further structural and functional features of the network entity, reference is made to what already disclosed above with reference to the first aspect and second aspect of the invention.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein.

DETAILED DESCRIPTION OF THE INVENTION

Figure 2:
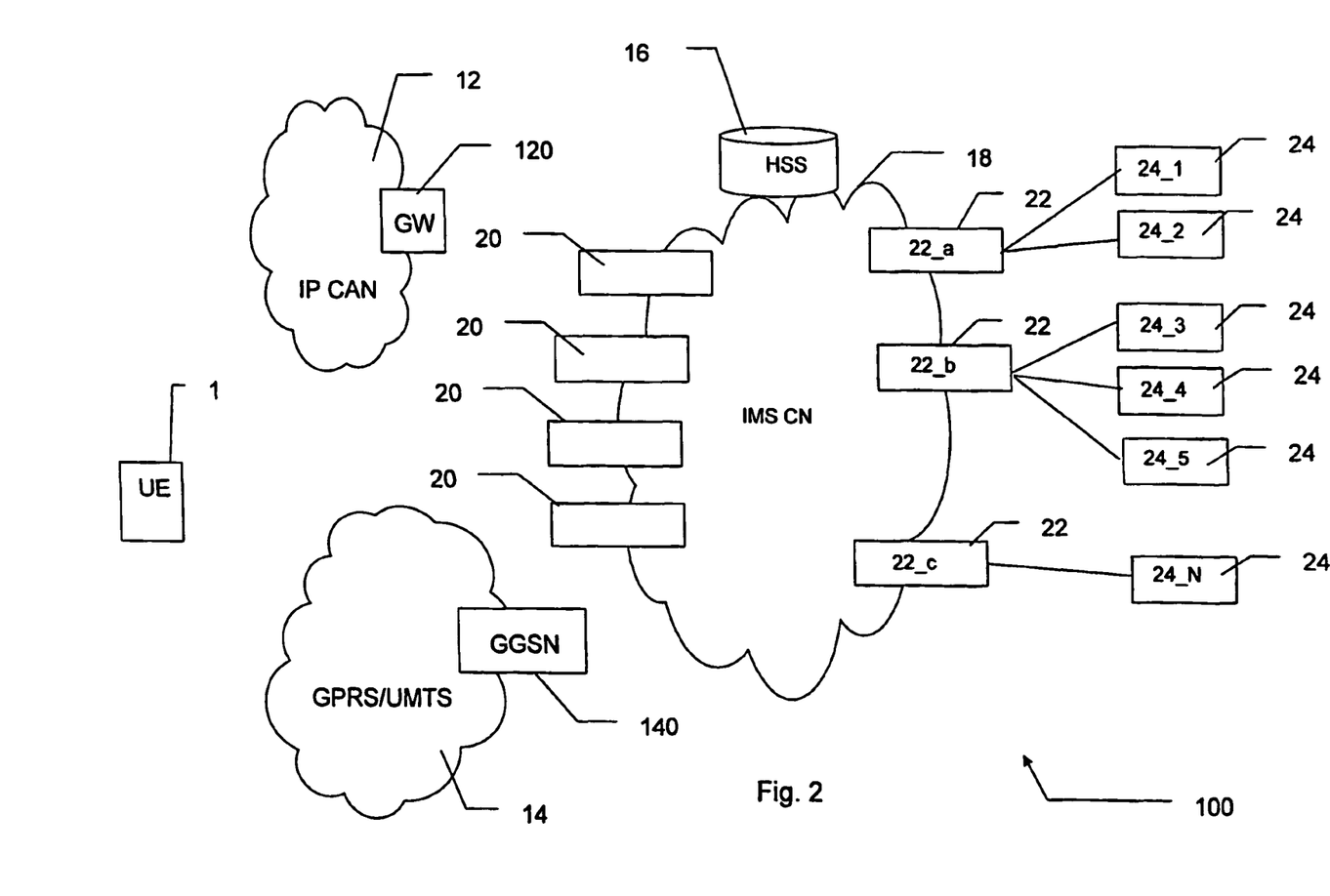
FIG. 2 schematically shows an embodiment of a telecommunication network according to the invention.

FIG. 2 shows a IMS type telecommunication network 100 according to an embodiment of the invention comprising a plurality of first network entities 20, a plurality of second network entities 22 (22_a, 22_b and 22_c) and a set of N application servers 24 (24_1, 24_2, ... 24_N).

According to the invention, each second entity 22 is adapted to access a predetermined sub-set of application servers. For example, in FIG. 2, second entity 22_a is adapted to access application servers 24_1 and 24_2, second entity 22_b is adapted to access application servers 24_3, 24_4 and 24_5, and second entity 22_c is adapted to access application server 24_N.

As stated above, application servers 24 offer either the basic logic for multimedia services or value added IM services and can reside either in the user's home network or in a third party location. The third party could be a network (e.g.: a corporate network) or simply a stand-alone AS.

Examples of services offered in the IMS are supplementary services (call forwarding, CCBS call completion on busy subscriber), voice call continuity, corporate services, voice call, video call, voice/video exchange between two user and data traffic between them, chatting, multiparty conferencing, access to web Services, and so on.

According to the embodiment shown, the telecommunication network 100 also comprises a IMS core network (CN) 18 which the first and second network entities 20, 22 are associated with, a HSS 16 associated with the IMS core network 18, a generic IP Connectivity Access Network (CAN) 12, a GPRS/UMTS access network 14 and a user equipment 1.

The IP CAN 12 and the GPRS/UMTS access network 14 are connected to the IMS core network 18 through gateway (GW) 120 and GGSN 140, respectively.

It is noted that, even if a plurality of user equipments are usually provided, for the sake of simplicity only one user equipment is depicted in FIG. 2.

Moreover, it is noted that the IP CAN 12 and the GPRS/UMTS access network 14 have been depicted in FIG. 2 as non-limiting examples and that other access networks may be used in the communication system according to the invention.

As IP CAN, GPRS, UMTS and IMS technologies are well known in the art, the above mentioned IP CAN, GPRS/UMTS access network, IMS CN, HSS, GGSN, GW, will not be further described in detail hereinafter.

As an example and not by way of limitation, the user equipment 1 may include a computer, a phone (which may be a mobile phone, a fixed phone or another phone), a personal digital assistant (PDA) and so on.

The IP CAN 12 and the GPRS/UMTS access network 14 allow the user equipment 1 to have access to the IMS core network 18 through gateway (GW) 120 and GGSN 140, respectively. In its turn, as explained in more detail below, the IMS core network 18 accesses (through the second network entities 22) the application servers 24 in order to meet the service requests made by a user through user equipment 1.

The first network entities 20, the second network entities 22, the HSS 16, the gateway 120, the GGSN 140, the application servers 24, and the user equipment 1 comprises hardware modules, software modules, firmware modules and/or combinations thereof, adapted to implement the invention, according to the various aspects thereof.

The user equipment 1, after registration in the IP CAN 12 or GPRS/UMTS access network 14, and after gaining IP connectivity, according to techniques well know in the art, is adapted to gain access to the services offered by the IMS, by registering itself to the IMS core network 18.

At the registration in the IMS core network 18, one of the plurality of the first network entities 20 is assigned to the user equipment 1 in a manner similar to what disclosed above with reference to the S-CSCF assignment in FIG. 1.

The assigned first network entity 20 is in charge of performing session control services for the user equipment 1, handling the signalling messages to set-up, modify and terminating a session/call.

Figure 3:
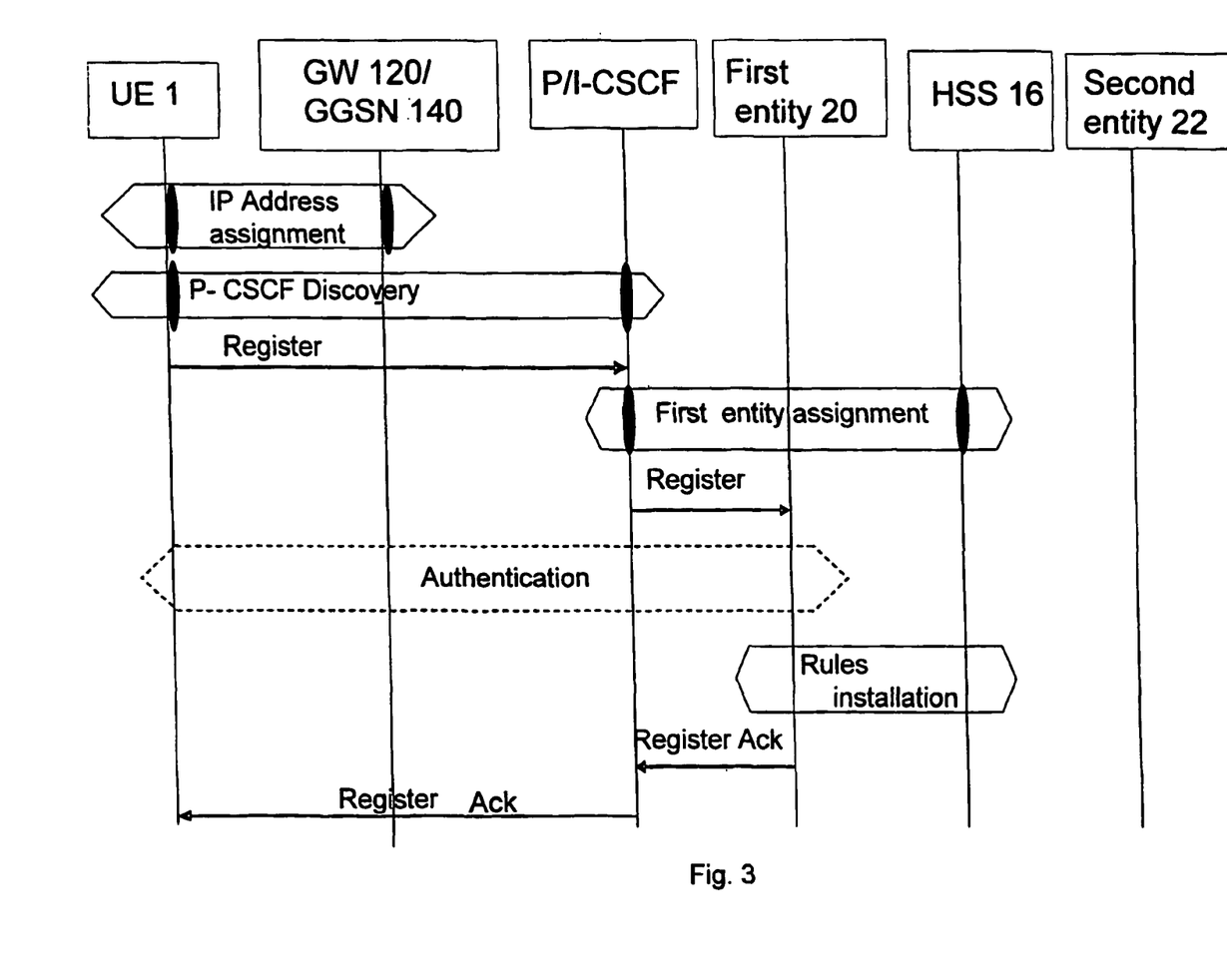
FIG. 3 schematically shows an example of the principal messages exchanged for a IMS type registration procedure according to an embodiment of the invention.

FIG. 3 schematically shows an example of the principal messages exchanged for a IMS type registration procedure according to an embodiment of the invention, in case the user equipment 1 is in roaming or more generally in case the user equipment (UE) 1 performs a Proxy-CSCF discovery as specified in 3GPP TS 23.228.

In FIG. 3, after gaining IP connectivity and performing the P-CSCF discovery procedure, the user equipment 1 sends a SIP Register message which is received by the discovered P-CSCF and then by an Interrogating-CSCF similarly to the procedure specified in 3GPP TS 23.228 and to what disclosed with reference to FIG. 1.

It is noted that for the sake of clarity P-CSCFs and I-CSCFs are not shown in FIG. 2.

At this point the I-CSCF interacts, similarly to the procedure specified in 3GPP TS 23.228 and to what disclosed with reference to FIG. 1, with the HSS 16 in order to identify one of the plurality of the first network entities 20 to be assigned to that particular user equipment 1. For example, the assignment is performed on a geographical basis and/or on a load-sharing basis.

After this interaction, the Register message is propagated to the assigned first network entity 20 which on its turn can optionally perform an IMS Authentication according to the procedure specified in 3GPP TS 23.228.

According to the embodiment shown, the assigned first network entity 20 is advantageously also adapted to interact with the HSS 18 in order to obtain a set of suitable rules to handle a subsequent user equipment service request. According to another embodiment, the set of rules can be preconfigured on the first network entities 20.

According to the invention, said rules associate each type of service that can be required by a user equipment with a predetermined second network entity 22. For example, in the embodiment of FIG. 2, said rules will associate the types of services offered by application servers 24_1 and 24_2 with the second entity 22_a, the types of services offered by application servers 24_3, 24_4 and 24_5 with the second entity 22_b, and the types of services offered by application server 24_N with the second entity 22_c.

If all these phases are correctly executed, a positive registration acknowledgement message is sent back to the user equipment 1.

Figure 4:
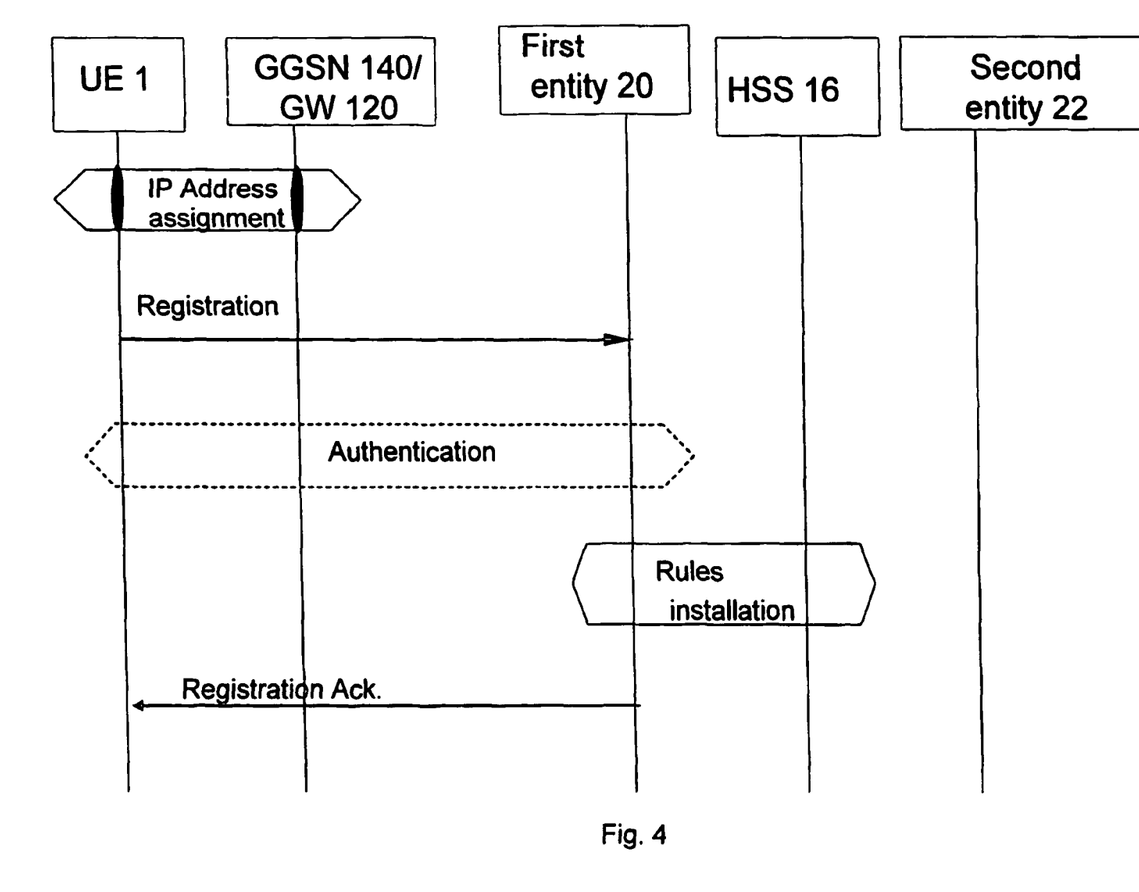
FIG. 4 schematically shows an example of the principal messages exchanged for a IMS type registration procedure according to another embodiment of the invention.

FIG. 4 schematically shows an example of the principal messages exchanged for a registration procedure according to another embodiment of the invention that can be carried out when the user equipment 1 is in its home domain or, more generally, when the user equipment 1 does not perform a P-CSCF discovery procedure. According to this embodiment, the name/address information about one of the plurality of the first network entities 20 is preconfigured on the user equipment 1, for example on the USIM/ISIM (Universal Subscriber Identity Module/IMS Subscriber Identity Module) thereof. Alternatively, said name/address information can be passed to the user equipment 1 through the phase of IP address acquisition (e.g.: PDP context activation, DHCP configuration, etc.).

In FIG. 4, after gaining IP connectivity, the user equipment 1 sends a SIP Register message addressed to the first network entity 20 the name/address information of which is preconfigured thereon.

The first network entity 20 receives the Register message and can optionally perform an IMS Authentication according to the procedure specified in 3GPP TS 23.228.

According to the embodiment shown, the first network entity 20 is advantageously also adapted to interact with the HSS 16 in order to obtain the above mentioned set of rules to handle a subsequent user equipment service request. According to another embodiment, the set of rules can be preconfigured on the first network entities 20.

If all these phases are correctly executed, a positive registration acknowledgement message is sent back to the user equipment 1.

According to another embodiment (not shown), in case the user equipment 1 is in its home domain or, more generally, in case the user equipment 1 does not perform a P-CSCF discovery procedure, the assignment of one of the plurality of first entities 20 to the user equipment 1 can also be carried out through the GGSN 140 or the GW 120, for example, based on the IP address associated with the user equipment 1 in the Register message, and/or on a load-sharing basis.

Once successfully registered in the IMS core network 18, the user equipment 1 can have access to the services offered in the IMS.

According to two different embodiments of the invention, in the provision of services to the user equipment 1, the first network entity 20 assigned thereto during the registration procedure can act either as proxy server or as redirect server. As shown in more detail below, when acting as proxy server, the first network entity 20 acts as intermediary between the user equipment 1 and the second network entity 22. When the first network entity 20 acts as redirect server, the service request made by the user equipment is redirected to the second network entity 22.

Figure 5:
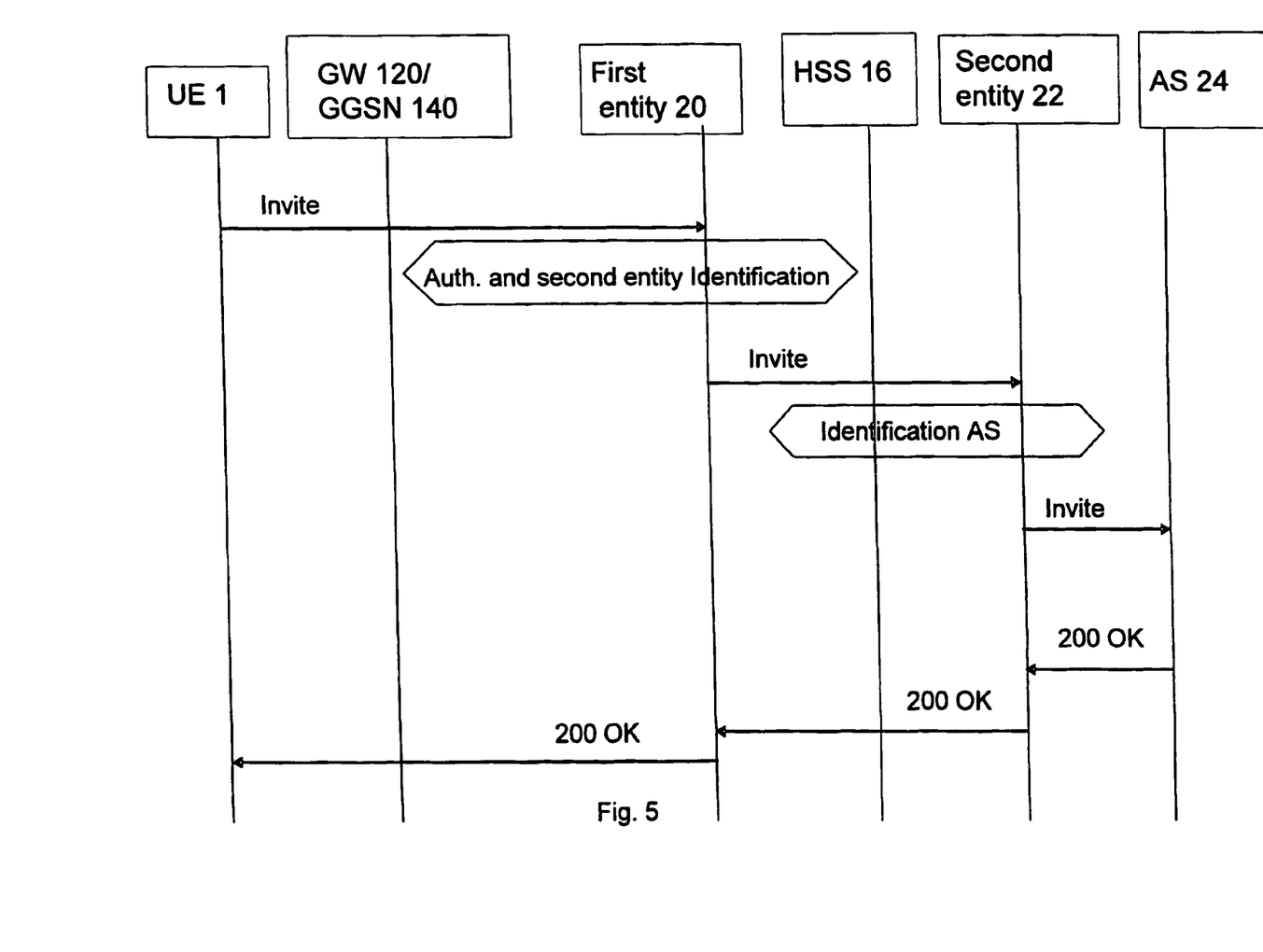
FIG. 5 schematically shows an example of the principal messages exchanged according to a first embodiment of the invention for the provision of a service to a user equipment.
Figure 6:
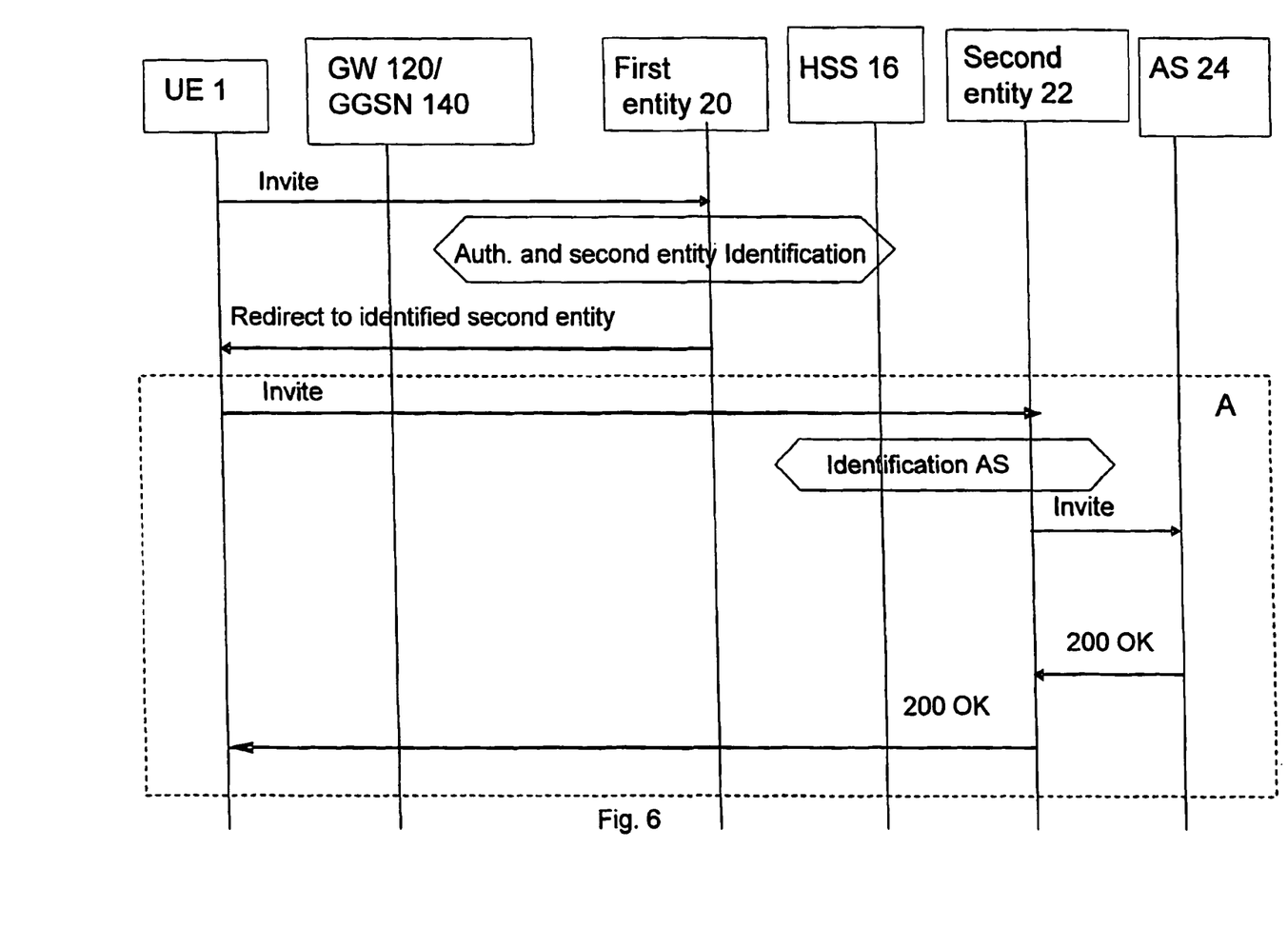
FIG. 6 schematically shows an example of the principal messages exchanged according to a second embodiment of the invention for the provision of a service to a user equipment.

FIGS. 5 and 6 show two examples of the principal messages exchanged according to the invention when the first network entity 20 acts as proxy server and as redirect server, respectively.

By way of non-limiting example, in the embodiments shown, the exchanged messages are 3GPP-SIP methods.

In the example of FIG. 5, a user requests through a suitable user interface (not shown) the user equipment 1 to send a SIP Invite message to the first network entity 20 assigned thereto, so as to request a specific service. The SIP Invite message includes the description of the service requested (for example, encoded with the known session description protocol (SDP)) and, optionally, can also contain a service identifier (service_Id).

At the receipt of said SIP Invite message, the first network entity 20 checks whether the user equipment 1 is entitled, according to a predetermined authorization policy and subscribed services, to have access to the service requested. In the positive, it analyzes the characteristics of the session required (e.g. the SDP enclosed in the SIP Invite message and, optionally, the service identifier) in order to identify, based on the service requested by the user equipment 1, the second network entity 22 which, among the plurality of second network entities 22, has access to the application server 24 that, among the set of application servers 24, allows meeting the service request by the user equipment 1. Advantageously, the identification is performed by using the above mentioned set of rules associating each type of service that can be required by a user equipment with a predetermined second network entity.

For example, when the user equipment 1 requests a type of service offered by the application server 24_3, the second network entity 22_b will be identified.

After identification of the proper second network entity 22, the first network entity 20 sends the SIP Invite message to the identified second network entity 22 (e.g. 22_b).

At the receipt of the SIP Invite message, the identified second network entity 22 (e.g. 22_b) analyzes the characteristics of the session required (e.g. the SDP enclosed in the SIP Invite message and, optionally, the service identifier) in order to identify, based on the service requested by the user equipment 1, the application server 24 (e.g. 24_3) that, among the sub-set it has access to, allows meeting the service request made by the user equipment. Advantageously, the identification is performed by using suitable filter criteria associating with each type of service offered by the sub-set of application server (e.g. 24_3, 24_4, 24_5), the application server (e.g.; 24-3) offering the specific service requested by the user equipment.

In the embodiment shown, after identification of the proper application server, the second network entity 22 (e.g., 22_b) sends a SIP Invite message to the identified application server 24 (e.g., 24_3), including the service request made by the user equipment 1.

At the receipt of the SIP Invite message from the second entity 22, the application server 24 checks whether the user equipment 1 is entitled, according to a predetermined authorization policy, to have access to the service requested and, in the positive, replies with a 200 OK message which propagates to the user equipment 1 through the second entity 22 and the first entity 20.

The embodiment shown, wherein the second network entity 22 sends the SIP Invite message to the identified application server 24, contemplates the case in which the service requested by the user equipment is offered by the application server. In another embodiment (not shown) wherein the application server offers to the second network entity only the basic logic for implementing the service requested by the user equipment (e.g., in the case of a video call request), the second network entity 22 does not send the SIP Invite message to the identified application server 24 but only accesses the identified application server 24 in order to gather the basic logic required to implement the service requested by the user equipment 1.

Turning now to the example of FIG. 6, the user equipment 1 sends a SIP Invite message to the first network entity 20 assigned thereto, so as to request a specific service. As in the embodiment of FIG. 5, the SIP Invite message includes the description of the service requested (for example, coded with the session description protocol (SDP)) and, optionally, can contain also a service identifier (service_Id).

As in the embodiment shown in FIG. 5, at the receipt of said SIP Invite message, the first network entity 20 checks whether the user equipment 1 is entitled, according to a predetermined authorization policy and subscribed services, to have access to the service requested. In the positive, it analyzes the characteristics of the session required (e.g. the SDP enclosed in the SIP Invite message and, optionally, the service identifier) in order to identify, based on the service requested by the user equipment 1, the second network entity 22 which, among the plurality of second network entities 22, is associated with the application server 24 that, among the set of application servers 24, offers the service requested by the user equipment 1.

At this point, differently from the embodiment of FIG. 5, after identification of the proper second network entity 22, the first network entity 20 sends a SIP Redirect message to the user equipment 1, including information identifying the service requested and name/address information about the identified second network entity so as to enable the user equipment 1 to redirect the request for the predetermined service to said second network entity 22.

At the receipt of said Redirect message, the user equipment 1 retrieves from it the second network entity name/address information and redirects the request for the predetermined service to said second network entity in a suitable SIP Invite message.

At this point, the flow of messages is wholly similar to what disclosed with reference to FIG. 5.

In view of the above description, it is noted that the service provision according to the embodiment of FIG. 5, wherein the first network entity 20 acts as proxy server, does not need any particular requirement for the user equipment. Moreover, the provision of a new service in the communication network (e.g., a new application server deployed in the network) does not substantially impact on the first network entities 20.

In its turn, the service provision according to the embodiment of FIG. 6, wherein the first network entity 20 acts as redirect server, needs the user equipment to be adapted to maintain an association between a specific service request and the second network entity assigned thereto for serving said specific service request.

Figure 7:
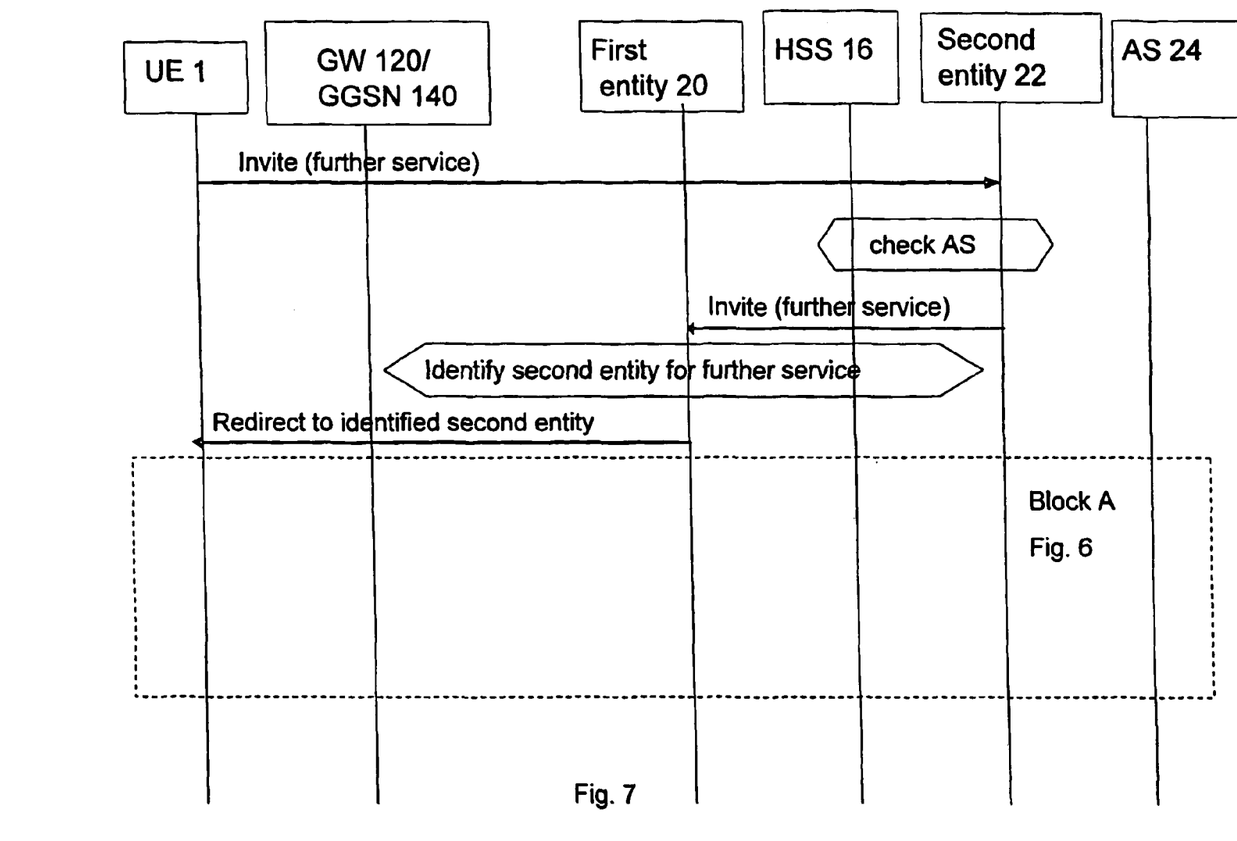
FIG. 7 schematically shows an example of the principal messages exchanged according to the invention, when the second network entity, which has handled the provision of a first service to the user equipment according to the flow of messages of FIG. 6, receives from the user equipment a request for a further service.

FIG. 7 shows an example of the principal messages exchanged according to the invention, when the second network entity, which has handled the provision of a first service to the user equipment 1 according to the flow of messages of FIG. 6, receives from the user equipment 1 a request for a further service.

In particular, in FIG. 7 the user equipment 1 sends a SIP Invite message to the second network entity 22 assigned thereto, so as to request a further service. The SIP Invite message includes the description of the service (for example, encoded with session description protocol (SDP)) and, optionally, can also include a service identifier (service_Id).

At the receipt of said SIP Invite message, the second network entity 22 (e.g., 22_b) checks whether, among the sub-set of application servers it has access to (e.g. 24_3, 24_4, 24_5), there is one application server offering the further service requested by the user equipment 1. In the positive (case not shown), the second network entity 22 accesses the application server thus identified in order to meet the further service request made by the user equipment 1. In the negative (case shown in FIG. 7), the second network entity 22 sends a SIP Invite message, containing said request for the further service, to the first network entity 20 which previously sent it the request for the first service.

At this point, the flow of messages for managing the request for the further service is wholly similar to what disclosed with reference to FIG. 6.

In view of the above description, at the registration of the user equipment in the IMS core network 18, a first network entity 20 is assigned to the user equipment 1 to perform session control, through a registration procedure as disclosed with reference to FIGS. 3 and 4. At the request for a specific service by the user equipment 1, the assigned first network entity 20 identifies, based on the service requested, the second network entity 22 which has access to the application server that allows meeting the specific service request made by the user equipment 1.

As already stated above, with respect to what disclosed by 3GPP TS 23.228, this architecture enables each second network entity to be configured so that is adapted to have access only to a sub-set of the application servers 24_1 to 24_N.

This allows simplifying the configuration of the network entities and the filter criteria to be used by them.

Moreover, this allows specializing the operations executed in a second network entity so as to enable it to have access only to a particular (set of) application server(s) which could be specific either for offering specific services (e.g., corporate services) or for serving particular kind of user equipments (e.g., for serving the mobile telephones of a predetermined manufacturing company).

Moreover, this allows dedicating the operation of a second network entity to an application server owned by a third party (e.g. a corporate network which provides dedicated services to its employees). This is advantageous in terms of privacy and security issues.

For example, the following architectures may be provided:
the second network entity can be located inside the IMS-provider/operator network and the operator itself can be a service provider, i.e. the AS is provided by the operator; this scenario has the advantage of giving more flexibility for the network configuration and resources optimization;
the second network entity can be located in the IMS-provider network, while the AS may reside in a third party network;
the second network entity can be located in a third party network, e.g. a corporate network, that owns also an appropriate AS; this has the advantage of allowing the corporate network to develop some simple services using some HSS-data downloaded in the corporate network and to be easily accessed; however, this imposes some requirements to the corporate network that must handle a 3GPP SIP interface;
the second network entity and the AS can be in the IMS-provider network, the AS having a web services interface to the corporate network.

It is noted that in the embodiments shown, the first network entities 20 and the second network entities 22 are disclosed as playing two distinct roles. The first network entities 20 are assigned to the user equipment 1 to perform session control at the registration of the user equipment in the IMS core network 18 while the second network entities 22 are assigned to the user equipment at the request for a specific service, based on the service requested. However, according to the invention, any of the first and second network entities may be adapted to act in both roles.

The invention claimed is:
1. A method for managing a provision of IP multimedia services in a telecommunication network, wherein the IP multimedia services are offered through a set of servers and the telecommunication network comprises at least one first network entity and a plurality of second network entities, comprising:

1) storing at said first network entity predetermined rules associating each type of IP multimedia service with a second network entity having access to a server offering said IP multimedia service, each second network entity being different from said first network entity and being adapted to access only a respective sub-set of said set of servers, each respective sub-set being different than other sub-sets;
2) receiving at said first network entity a request for a predetermined IP multimedia service from user equipment; and
3) at said first network entity, using said predetermined rules for selecting, based on the IP multimedia service requested by the user equipment, the second network entity which, among the plurality of second network entities, has access to the server that, among the set of servers in the network and the sub-set of servers the selected second network entity only has access to, allows meeting the request for the predetermined IP multimedia service.

2. The method according to claim 1, further comprising:
4) notifying the request made by the user equipment to the second network entity selected in 3).

3. The method according to claim 2, further comprising:
5) identifying at said selected second network entity the server that, among the sub-set said selected second network entity has access to, allows meeting the request for the predetermined IP multimedia service.

4. The method according to claim 3, further comprising:
6) accessing the selected second network entity by the server identified in 5) so as to meet the request for the predetermined IP multimedia service.

5. The method according to claim 2, wherein, in 4), the request is notified to the selected second network entity from the first network entity.

6. The method according to claim 2, wherein, in 4), the request is notified to the selected second network entity from the user equipment.

7. The method according to claim 6, wherein 4) is subordinated to sending from the first network entity to the user equipment, information about the second network entity selected in 3) so as to enable the user equipment to redirect the request for the predetermined IP multimedia service to the selected second network entity.

8. The method according to claim 6, further comprising receiving at the second network entity selected in 3), a further request from the user equipment for a further service.

9. The method according to claim 8, further comprising checking at the selected second network entity if, among the sub-set of servers said selected second network has access to, there is a server that allows meeting the further request for the further IP multimedia service made by the user equipment.

10. The method according to claim 9, wherein, in a positive case, further comprises access by the selected second network entity to the server that allows meeting the further request for the further IP multimedia service so as to meet the further request for the further IP multimedia service.

11. The method according to claim 10, wherein, in a negative case, further comprises notifying said further request for the further IP multimedia service from the selected second network entity to the first network entity.

12. The method according to claim 11, further comprising:
5) receiving at said first network entity a request for a further predetermined IP multimedia service from user equipment;
6) at said first network entity, identifying, based on the further IP multimedia service requested by the user equipment, the second network entity which, among the plurality of second network entities, has access to a server that, among the set of servers, allows meeting the request for the further predetermined IP multimedia service;
7) notifying the further request made by the user equipment to the second network entity identified in 2);
8) identifying at said identified second network entity the server that, among the sub-set said identified second network entity has access to, allows meeting the request for the further predetermined IP multimedia service; and
9) accessing the identified second network entity by the server identified in 4) so as to meet the further request for the further predetermined service, for managing said further request for the further service.

13. A telecommunication network for a provision of IP multimedia services to user equipment, the services being offered through a set of servers, comprising:
at least one first network entity; and
a plurality of second network entities, each second network entity being different from said first network entity and being adapted to access only a respective sub-set of said set of servers, each respective sub-set being different than other sub-sets, wherein the at least one first network entity stores predetermined rules associating each type of IP multimedia service with a second network entity having access to a server offering said IP multimedia service, and comprises modules capable of being adapted to receive a request for a predetermined IP multimedia service from the user equipment and to use said predetermined rules for selecting, based on the IP multimedia service requested by the user equipment, the second network entity which, among the plurality of second network entities, has access to the server that, among the set of servers in the network and the sub-set of servers the selected second network entity only has access to, allows meeting the IP multimedia service request by the user equipment multimedia service.

14. The telecommunication network according to claim 13, wherein each second network entity comprises modules capable of being adapted to receive said request for the predetermined IP multimedia service.

15. The telecommunication network according to claim 13, wherein each second network entity is also capable of being adapted to identify the server, among the sub-set the second network entity has access to, that allows meeting the request for the predetermined IP multimedia service.

16. The telecommunication network according to claim 15, wherein each second network entity is also capable of being adapted to access the identified server so as to meet the request for the predetermined IP multimedia service.

17. The telecommunication network according to claim 13, wherein each second network entity is capable of being adapted to receive the IP multimedia service request made by the user equipment from the first network entity.

18. The telecommunication network according to claim 13, wherein each second network entity is capable of being adapted to receive the IP multimedia service request from the user equipment.

19. The telecommunication network according to claim 18, wherein the first network entity is capable of being adapted to send to the user equipment, information about the selected second network entity so as to enable the user equipment to redirect the request for the predetermined IP multimedia service to said selected second network entity.

20. The telecommunication network according to claim 18, wherein each second network entity is also capable of being adapted to receive a further request for a further IP multimedia service from the user equipment.

21. The telecommunication network according to claim 20, wherein each second network entity is also capable of being adapted to check if, among the sub-set of servers the second network entity has access to, there is a server that allows meeting the further IP multimedia service request.

22. The telecommunication network according to claim 21, wherein, each second network entity is also capable of being adapted, in a positive case, to access the server that allows meeting the further request for the further IP multimedia service so as to meet the further request for the further IP multimedia service.

23. The telecommunication network according to claim 21, wherein, each second network entity is also capable of being adapted, in a negative case, to send said further request for the further IP multimedia service to the first network entity.

24. A network entity for use in a telecommunication network for a provision of IP multimedia services to user equipment, comprising modules capable of being adapted to store predetermined rules associating each type of IP multimedia service with a second network entity having access to a server offering said IP multimedia service, each second network entity being different from said network entity and being adapted to access only a respective sub-set of said set of servers, each respective sub-set being different than other sub-sets, receive a request for a predetermined IP multimedia service from the user equipment and to select, based on the IP multimedia service requested by the user equipment, the second network entity which, among a plurality of second network entities, has access to the server that, among a set of servers in the network and the sub-set of servers the selected second network entity only has access to, allows meeting the IP multimedia service request by the user equipment multimedia service.

* * * * *